United States Patent
Park et al.

(10) Patent No.: US 8,271,752 B2
(45) Date of Patent: Sep. 18, 2012

(54) RECORDING MEDIUM, METHOD AND APPARATUS FOR RECORDING ON RECORDABLE RECORDING MEDIUM, AND METHOD FOR MANAGING BACKUP FILES OF THE SAME

(75) Inventors: Sung Wan Park, Suwon-si (KR); Kang Soo Seo, Anyang-si (KR); Byung Jin Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 1580 days.

(21) Appl. No.: 11/723,815

(22) Filed: Mar. 22, 2007

(65) Prior Publication Data

US 2007/0172209 A1    Jul. 26, 2007

Related U.S. Application Data

(63) Continuation of application No. 11/077,140, filed on Mar. 11, 2005, now Pat. No. 7,644,243.

(60) Provisional application No. 60/552,396, filed on Mar. 12, 2004.

(30) Foreign Application Priority Data

Mar. 9, 2005    (KR) ................. 10-2005-0019509

(51) Int. Cl.
*G06F 12/00* (2006.01)
(52) U.S. Cl. ........................................................ 711/162
(58) Field of Classification Search .................... 711/162
See application file for complete search history.

(56) References Cited

U.S. PATENT DOCUMENTS

| | | | |
|---|---|---|---|
| 7,003,711 | B2 | 2/2006 | Noda et al. |
| 7,107,419 | B1 | 9/2006 | Ghemawat et al. |
| 7,328,366 | B2 | 2/2008 | Michelman |
| 2002/0025138 | A1 | 2/2002 | Isobe et al. |
| 2002/0064374 | A1 | 5/2002 | Ando et al. |
| 2003/0059210 | A1 | 3/2003 | Ando et al. |
| 2003/0101861 | A1 | 6/2003 | Taira et al. |
| 2005/0108466 | A1 | 5/2005 | Takashima et al. |

FOREIGN PATENT DOCUMENTS

| | | |
|---|---|---|
| CN | 1383559 | 12/2002 |
| EP | 0 977 121 | 2/2000 |
| EP | 0984346 | 3/2000 |
| EP | 1102249 | 5/2001 |
| EP | 1 280 347 A1 | 1/2003 |
| EP | 1 515 337 | 3/2005 |
| JP | 60254460 | 12/1985 |

(Continued)

OTHER PUBLICATIONS

DVD-RW, Mar. 6, 2004, [online] [url=http://en.wikipedia.org/w/index.php?title=DVD-RW&oldid=2855537].*

(Continued)

*Primary Examiner* — Jared Rutz
(74) *Attorney, Agent, or Firm* — Harness, Dickey & Pierce, P.L.C.

(57) ABSTRACT

A method of recording data on a recording medium by a recording apparatus which is unable to create a backup file. The method includes deleting a backup file corresponding to an original file from the recording medium when the original file on the recording medium is modified or deleted.

8 Claims, 6 Drawing Sheets

FOREIGN PATENT DOCUMENTS

| | | |
|---|---|---|
| JP | 02-151945 | 6/1990 |
| JP | 2001-266496 | 9/2001 |
| JP | 2002-373099 | 12/2002 |
| JP | 2003-168266 | 6/2003 |
| JP | 2004-030863 | 1/2004 |
| KR | 2001-0054092 A | 7/2001 |
| KR | 2001-0054379 A | 7/2001 |
| RU | 2243588 | 12/2004 |
| WO | WO 99/09480 | 2/1999 |
| WO | WO 2005/004123 A1 | 1/2005 |

OTHER PUBLICATIONS

Office Action issued Mar. 19, 2008 by the USPTO in related U.S. Appl. No. 11/077,140.

Notice of Allowance for Russian patent application No. 2006136030 dated Sep. 24, 2009.

Office Action issued Oct. 24, 2008 by the U.S. Patent and Trademark Office in related U.S. Appl. No. 11/077,140.

European Office Action dated Jan. 13, 2012 issued in corresponding European Application No. 05721930.5.

English translation of Office Action dated Dec. 11, 2009 for counterpart Japanese Patent Application No. 2007-502716.

International Search Report issued Nov. 3, 2005 in corresponding International Patent Application No. PCT/KR2005/000670.

"80 mm (1,46 Gbytes per side) and 120 mm (4,70 Gbytes per side) DVD Re-Recordable Disk (DVD-RW)," ECMA Standardizing Information and Communication Systems, Standard ECMA-338, Dec. 2002.

Office Action issued Jul. 16, 2009 by the Russian Patent Office in counterpart Russian Patent Application No. 2006136030/28 (with English language translation).

* cited by examiner

RECORDING MEDIUM, METHOD AND APPARATUS FOR RECORDING ON RECORDABLE RECORDING MEDIUM, AND METHOD FOR MANAGING BACKUP FILES OF THE SAME

DOMESTIC PRIORITY INFORMATION

This is a continuation application of application Ser. No. 11/077,140 filed Mar. 11, 2005 now U.S. Pat. No. 7,644,243, the entire contents of which are hereby incorporated by reference.

This application also claims the benefit of priority under 35 U.S.C. §119(e) on U.S. Provisional Application No. 60/552,396, filed on Mar. 12, 2004, which is hereby incorporated by reference as if fully set forth herein.

FOREIGN PRIORITY INFORMATION

This application claims the benefit of priority under 35 U.S.C. §119 on Korean Application No. 10-2005-0019509, filed on Mar. 9, 2005 which is hereby incorporated by reference as if fully set forth herein.

BACKGROUND OF THE INVENTION

1. Field of the Invention

The present invention relates to a method and an apparatus for recording and managing files within a recording medium.

2. Discussion of the Related Art

Optical discs are widely used as a recording medium for recording mass data. Presently, among a wide range of optical discs, a new high-density optical recording medium, such as a Blu-ray Disc (hereinafter referred to as "BD"), is under development for writing and storing high definition video and audio data. Currently, global standard technical specifications of the Blu-ray Disc (BD), which is known to be the next generation technology, are under establishment as a next generation optical recording solution that is able to record and store data significantly surpassing the conventional DVD, along with many other digital apparatuses. Accordingly, methods for managing files of a recordable blu-ray disc (BD-RE/R) in a BD standard are currently under discussion. However, since the Blu-ray Disc (BD) standards are yet to be completed, there have been many difficulties in developing a complete optical reproducing apparatus.

SUMMARY OF THE INVENTION

An exemplary embodiment of the invention is directed to a method of recording data on a recording medium by a recording apparatus which is unable to create a backup file. The method includes deleting a backup file corresponding to an original file from the recording medium when the original file on the recording medium is modified or deleted.

Another exemplary embodiment of the invention is directed to an apparatus for recording data on a recording medium by a recording apparatus which is unable to create a backup file. The apparatus includes a controller deleting a backup file corresponding to an original file to be deleted when the original file is modified or deleted.

Another exemplary embodiment of the present invention relates to a recording medium. The recording medium having a stream area storing at least one stream file; an original management area storing at least one original management file, the original management file manages reproduction of the stream file; and a backup management area storing at least one backup management file corresponding to the original management file, the backup management file is a duplicate of the original management file, wherein the backup management file is deleted when the original management file is modified or deleted by a recording apparatus which is unable to create a backup file.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium. An "original file" refers to an essential file that must be included among the files being recorded on the optical disc. A "backup file" refers to a partial or full copy version of the original file. The backup file may be included optionally within the optical disc. The original file and the backup file will be described in detail with reference to FIG. 1.

Additionally, in the present invention, a "file system" refers to a set of information not only managing a logical structure (hereinafter referred to as a "Disc Volume") of the entire optical disc, but also managing all of the files recorded within the optical disc. Herein, such information is only recognized by the system and not recognized by the user. Therefore, in the present invention, a "File System Information" refers to diverse information creating the file system. Such file system information includes a "volume structure", an "anchor", a "Metadata (MD) file", and a "Metadata (MD) file entry (FE)". The volume structure and the anchor pointer represent the structure of the entire disc volume. The metadata (MD) file includes locations and attributes of the files recorded within the disc, and the metadata file entry represents the location of the metadata file. Furthermore, when the metadata file is scattered within the disc, a "Metadata (MD) partition map" is included in the metadata file entry.

Figure 1:
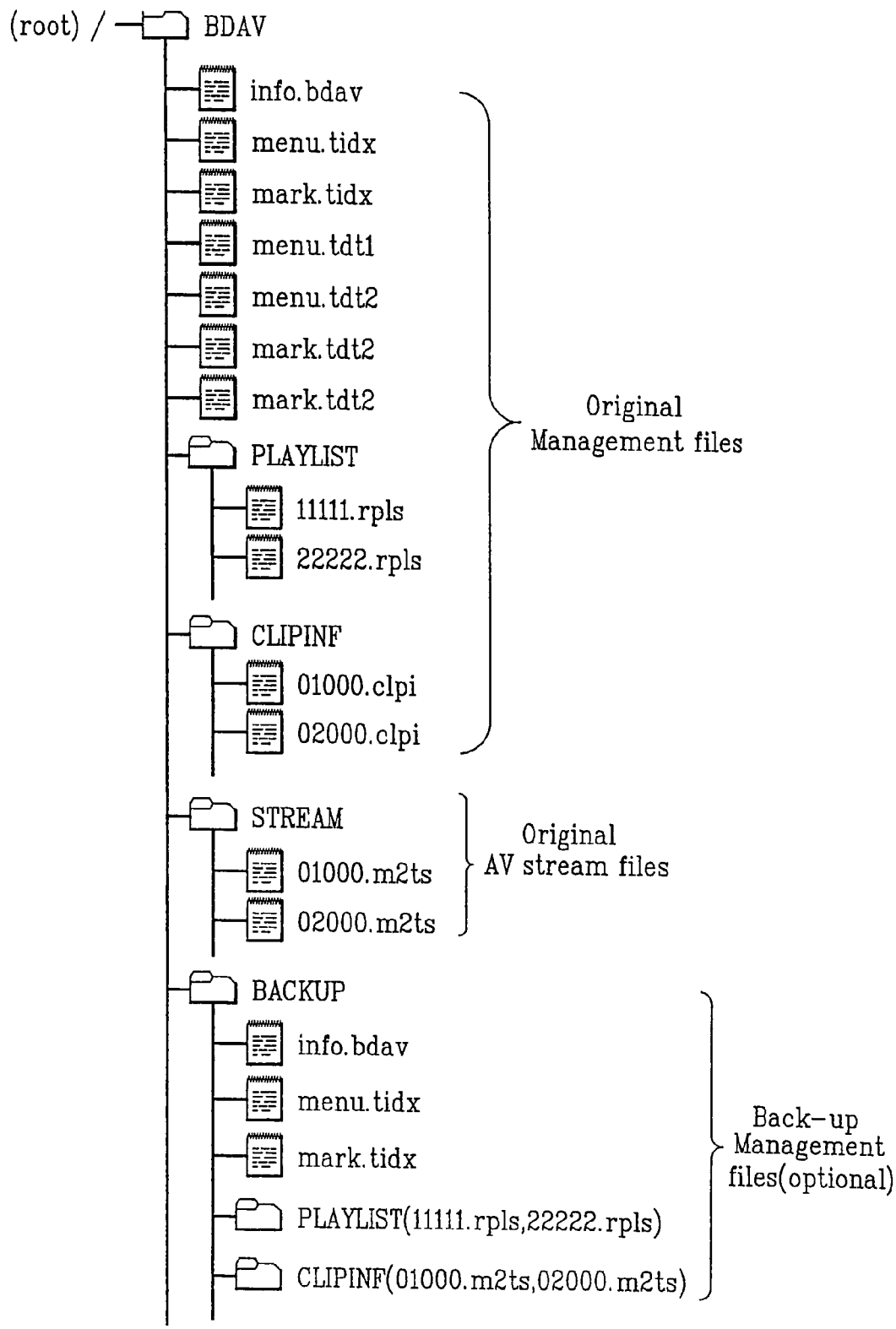
FIG. 1 illustrates a file structure of a recordable recording medium according to the present invention.

FIG. 1 illustrates a file structure of a recordable recording medium according to the present invention. The file structure that can be applied to a recordable optical disc according to the present invention includes at least one BD directory (BDAV), which is included in a root directory (root). Each BD directory includes an info file (info.bdav), menu files (menu.tidx, menu.tdt1, menu.tdt2), and mark files (mark.tidx, mark tdt1, mark.tdt2), which are used for interacting with one or more users. Each BD directory further includes four file directories that include information for reproducing and managing data recorded in an actual disc and information on methods for reproducing data. The file directories included in each BD directory are a stream directory (STREAM), a clip information directory (CLIPINF), a playlist directory (PLAYLIST), and a backup directory (BACKUP).

Each of the directories and file attributes will now be described in detail. First of all, the stream directory (STREAM) includes audio/video (AV) stream files (01000.m2ts, 02000.m2ts) having a particular data format, and each stream file (01000.m2ts, 02000.m2ts) represents AV data (or PC data) recorded on a specific area within the optical disc. Next, the clip information directory (CLIPINF) includes clip information files that correspond to the stream files (AV or text subtitle) included in the stream directory, respectively. Each clip information file contains property and reproduction timing information of a corresponding stream file. More specifically, the stream file (*.m2ts) and the clipinfo file (*.clpi), which are in one-to-one correspondence, are collectively referred to as a "clip". For example, 01000.clpi included in CLIPINF includes property information of 01000.m2ts included in STREAM, and 01000.clpi and 01000.m2ts form a clip.

Referring back to FIG. 1, the playlist directory (PLAYLIST) includes one or more PlayList files (*.rpls), where each PlayList file includes at least one PlayItem that performs reproduction of a specific clip. Therefore, a PlayList file (*.rpls) refers to a basic reproduction management file performing reproduction of a combination of desired clips by a combination of at least one PlayItem. In other words, in the above-described file structure, the stream files included in the stream directory (STREAM) refers to files (AV stream files) having actual user data recorded therein. Other directories and files are described as management files including reproduction management information for reproducing the stream files.

Therefore, when using the file structure according to the present invention, the management file being recorded within the disc includes an "original management file" and a "backup management file". In addition, since the management files are indispensable information for reproducing the stream files, the management files require a highly reliable protective solution. Therefore, a backup directory (BACKUP) is provided under the BDAV directory. And, management files for backup usage may be optionally recorded within the backup directory. More specifically, the optional recording of the backup directory is characteristic of the present invention, which is to provide flexibility in the development of the optical recording and reproducing apparatus. Therefore, it is apparent that an optical recording and reproducing apparatus that can record and manage a backup directory and an optical recording and reproducing apparatus that cannot record or manage a backup directory each has a different method for recording and managing a backup directory. This will be described in more detail with reference to FIGS. 4A and 4B.

Additionally, in creating backup management files configuring the backup directory, either the entire original management file is created or only a portion of the original management file is created. FIG. 1 illustrates a preferred example of creating backup management files with the original management files, with the exception of "menu.tdt1", "menu.tdt2", "mark.tdt1", and "mark.tdt2". Also, the backup file is given the same file name as its corresponding original file, and a BACKUP directory is created under the BDAV directory. Therefore, when a plurality of BDAV directories is created within an optical disc, a plurality of corresponding BACKUP directories is also created accordingly.

Figure 2A:
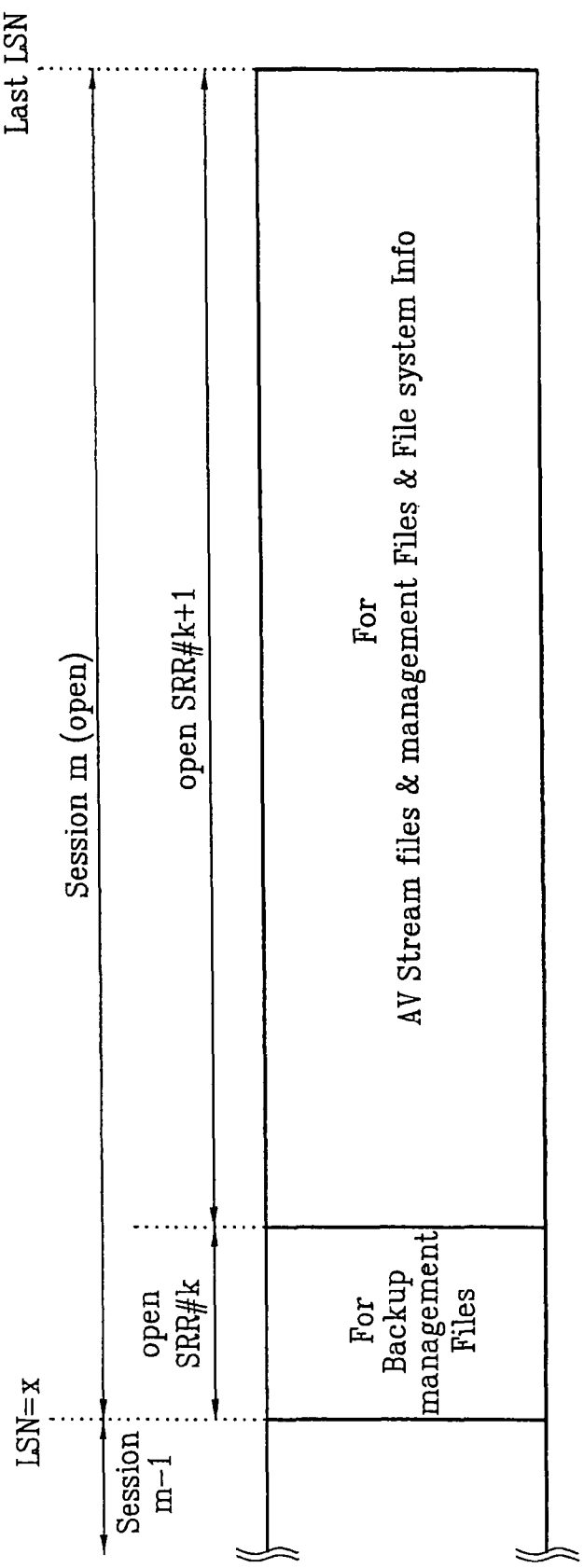
FIGS. 2A and 2B illustrate a method for recording files on the recordable recording medium according to the present invention.
Figure 2B:
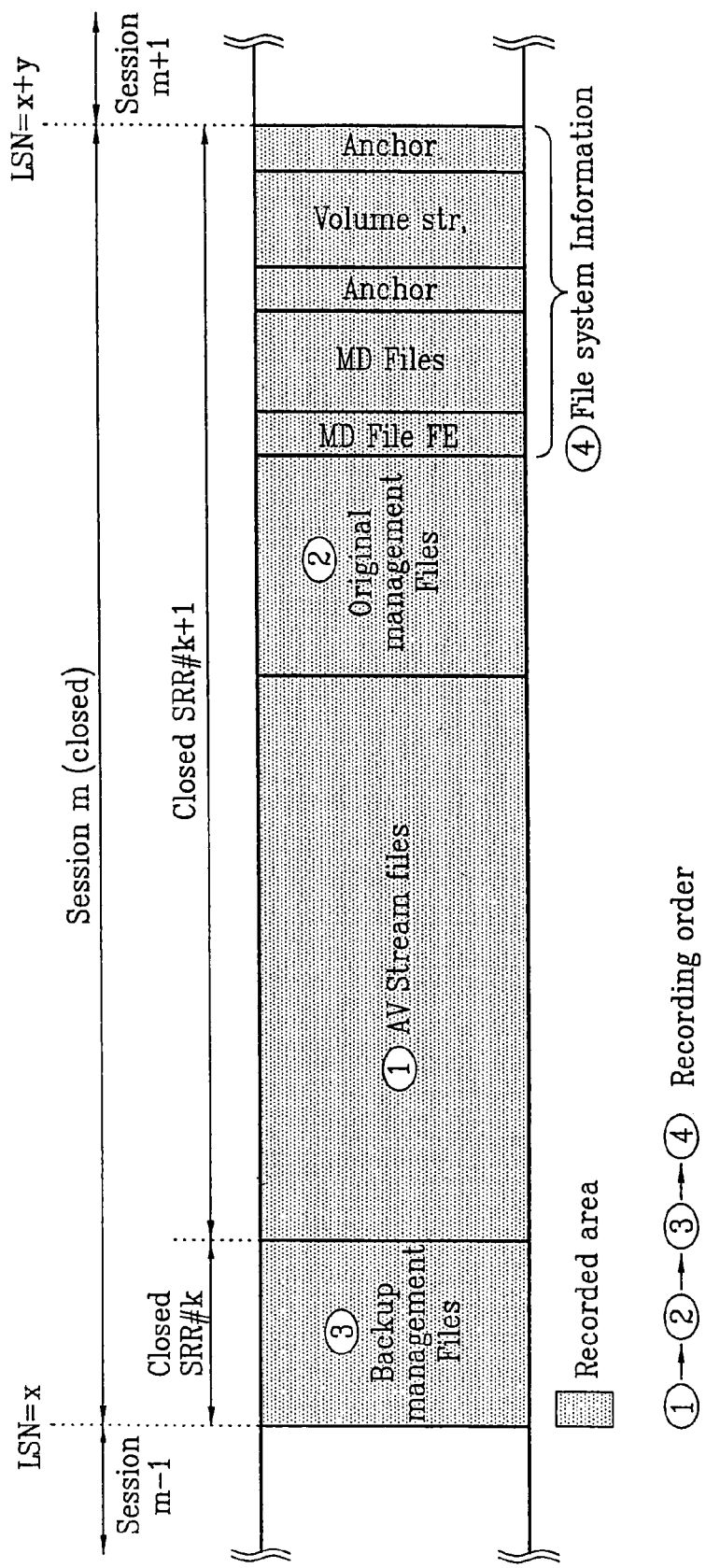

FIGS. 2A and 2B illustrate a method for recording files on the recordable recording medium according to the present invention. Most particularly, FIGS. 2A and 2B illustrate an example of a write-once recordable optical disc (e.g., blu-ray disc (BD-R)). Accordingly, the method for recording files according to the present invention has the following characteristics. First of all, an optical recorder first records a set of original files and, then, records corresponding backup files. The priority of this process is determined depending upon the importance of the corresponding original file. Secondly, an area for recording the backup files should be separately provided within the optical disc. For example, in case of a rewritable optical disc, an original file recording area and a backup file recording area should be separately allocated within a predetermined file information recording area. Further, in case of a write-once optical disc, a backup file recording area should be separately allocated within a data area, as shown in FIG. 2A.

FIG. 2A illustrates a method for recording files in a write-once optical disc, wherein a structure of a recording area for each file is allocated prior to recording the data within the optical disc. For example, FIG. 2A illustrates a method for recording data on a specific session (session #m) within a write-once optical disc. And, it is apparent that each session is recorded by using the same method.

In the embodiment of the present invention, the data recording area is pre-allocated with a first area and a second area. The first area is for recording backup management files, and the second area is for recording stream files, original management files, and file system information. More specifically, by creating the backup management files to be located at a location spaced apart from the location where the original management files are recorded, the object of protecting the management files can be achieved. Each of the allocated area, as described above, is referred to as a "Sequential Recording Range (SRR)". Most particularly, a recordable SRR is referred to as an "Open SRR", and a non-recordable SRR is referred to as a "Closed SRR".

Referring to FIG. 2A, two open SRRs are allocated, wherein Open SRR #k is used as an area for recording backup management files, and Open SRR #k+1 is used as an area for recording stream files, original management files, and file system information. In addition, when allocating backup Open SRR #k, the allocated size of a corresponding area should be decided by predicting the size of the original management files. For example, a write-once blu-ray disc (BD-R)

includes a maximum of 200 PlayList files (*.rpls) which equals to about 13 Kbytes, a maximum of 200 ClipInfo files (*.clpi) which amounts to about 1 Mbyte, and a file including diverse other info files (info.bdav) which equals to a maximum of 12 Kbytes. Taking into account the above estimated file size, the required overall file size can be predicted to be 1.046 Mbytes. However, considering possible defects in the corresponding area, it is preferable to add 10% to 20% of surplus size, which amounts to approximately 1.2 Mbytes.

FIG. 2B illustrates an example of a method for recording actual data of the first area (Open SRR #k) and the second area (Open SRR #k+1), as shown in FIG. 2A. More specifically, the stream files which the user wishes to be recorded are first recorded in SRR #k+1, and, subsequently, when the recording of the stream files is completed, the original management files are recorded as management files that reproduce the recorded stream files in continuation with the recorded stream files. Thereafter, the backup management files are recorded in the SRR #k, and the file system information is recorded in SRR #k+1 in continuation with the recorded original management files. Herein, the recording order is marked in numbers, as shown in FIG. 2B, for simplicity of the description.

As described above, the metadata files, the metadata file entry, the anchor, and the volume structure are recorded in the file system information. Also, after recording the file system information, it is preferable to change the recordable areas SRR #k and SRR #k+1 into non-recordable areas, (i.e., Closed SRRs). This is to prepare for unexpected situations caused by a system error, for example, after the file system information is validly recorded. In other words, data can be validly recovered from the Closed SRR in which the file system information is recorded even when unexpected accidents occur. Furthermore, when a corresponding session #m is closed, all of the SRRs existing within the session are closed as well. And, thereafter, data can no longer be recorded in the corresponding session, and future recording of data should be performed by allocating a new open session (session #m+1). At this point, the recording method used herein is identical to the recording method used in session #m, wherein Open SRRs are allocated for recording the backup management files.

Figure 3:
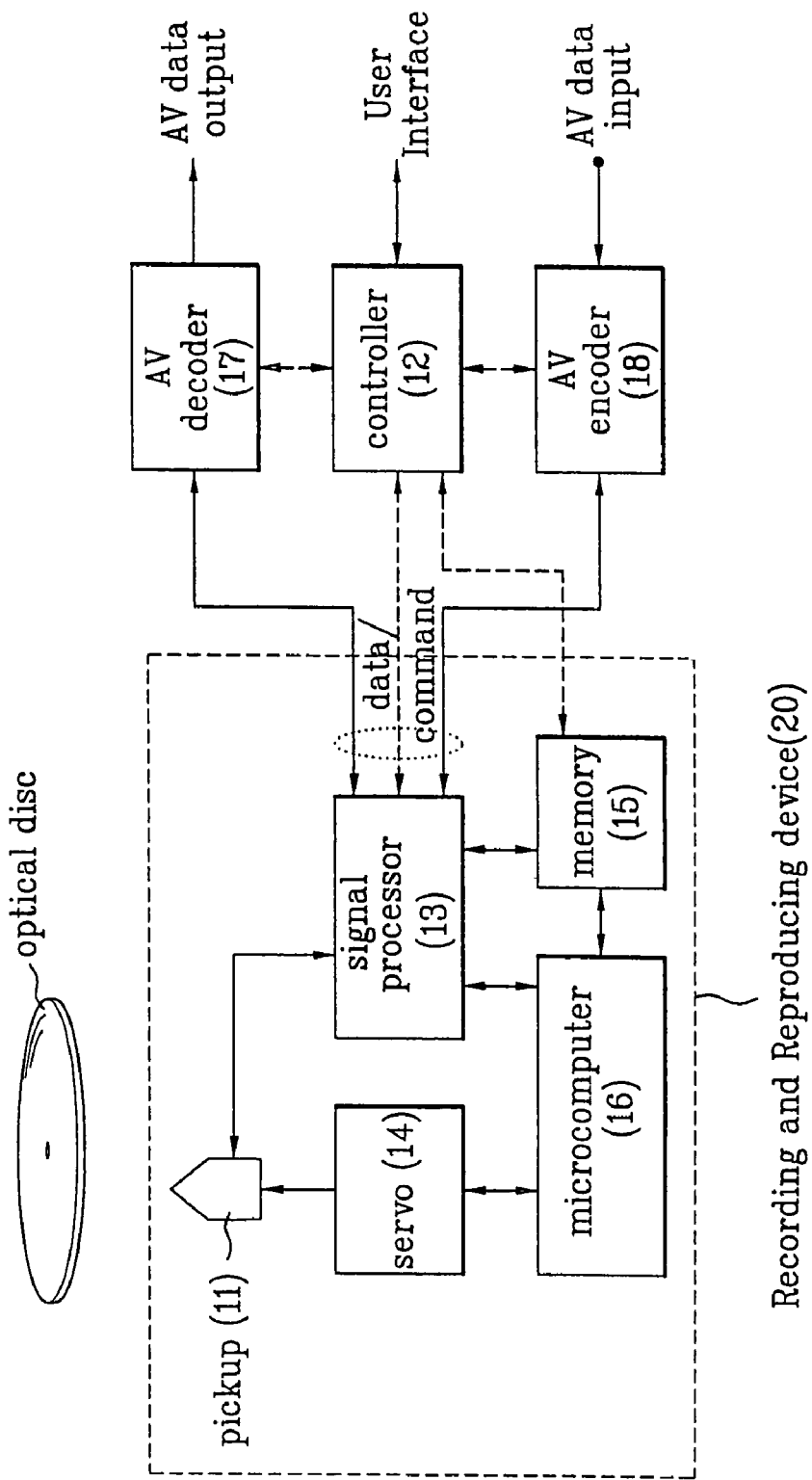
FIG. 3 illustrates an optical recording and reproducing apparatus according to the present invention.

Hereinafter, an optical recording and reproducing apparatus according to the present invention and a method for managing optical disc files using the same will now be described with reference to FIGS. 3, 4A, and 4B. FIG. 3 illustrates an optical recording and reproducing apparatus according to the present invention. The optical recording and reproducing apparatus basically includes a pick-up unit 11 for reading data and management information recorded on the optical disc, a servo 14 controlling the operations of the pick-up unit 11, a signal processor 13 either recovering the reproduction signal received from the pick-up unit 11 to a desired signal value, or modulating a signal to be recorded to an optical disc recordable signal and transmitting the modulated signal to the pick-up unit 11, a memory 15 for temporarily storing the management information read from the optical disc, and a microcomputer 16 controlling the above operations. This basic structure is referred to as a recording and reproducing device 20, which may also be referred to as a "drive".

Also, a controller 12 controls the overall operation of the optical recording and reproducing apparatus. The controller 12 receives a user command through a user interface and transmits the received user command to the microcomputer 16, so that operation of the apparatus can be controlled in accordance with the user command. Most particularly, the controller 12 uses the disc management information transmitted from the recording and reproducing device 20 and created a recording and reproducing command. Thereafter, the controller 12 transmits the command back to the recording and reproducing device 20.

In addition, an AV decoder and text subtitle (Text ST) decoder 17 performs final decoding of output data in accordance with the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13. More specifically, when a re-writable optical disc is loaded, the controller 12 controls the apparatus so that each of the stream files, the original management files, and the backup management files are respectively recorded in the pre-determined file information recording area and the user data recording area within the optical disc.

Furthermore, when a write-once optical disc is loaded, the controller 12 pre-allocates at least 2 areas for recording the stream files, the management files, and the file system information. In the preferred embodiment of the present invention (shown in FIG. 2A), two Open SRRs (Open SRR #k and Open SRR #k+1) are allocated. Subsequently, the controller 12 transmits a recording command corresponding to the data, which are to be recorded in each of the allocated areas, to the recording and reproducing device 20. Then, after receiving the recording command, the recording and reproducing device 20 operates the pick-up unit 11 by using the servo 14 and completes the recording of the original data within the area requested by the controller 12. Thereafter, the original management files, the backup management files, and the file system information are recorded in series.

Figure 4A:
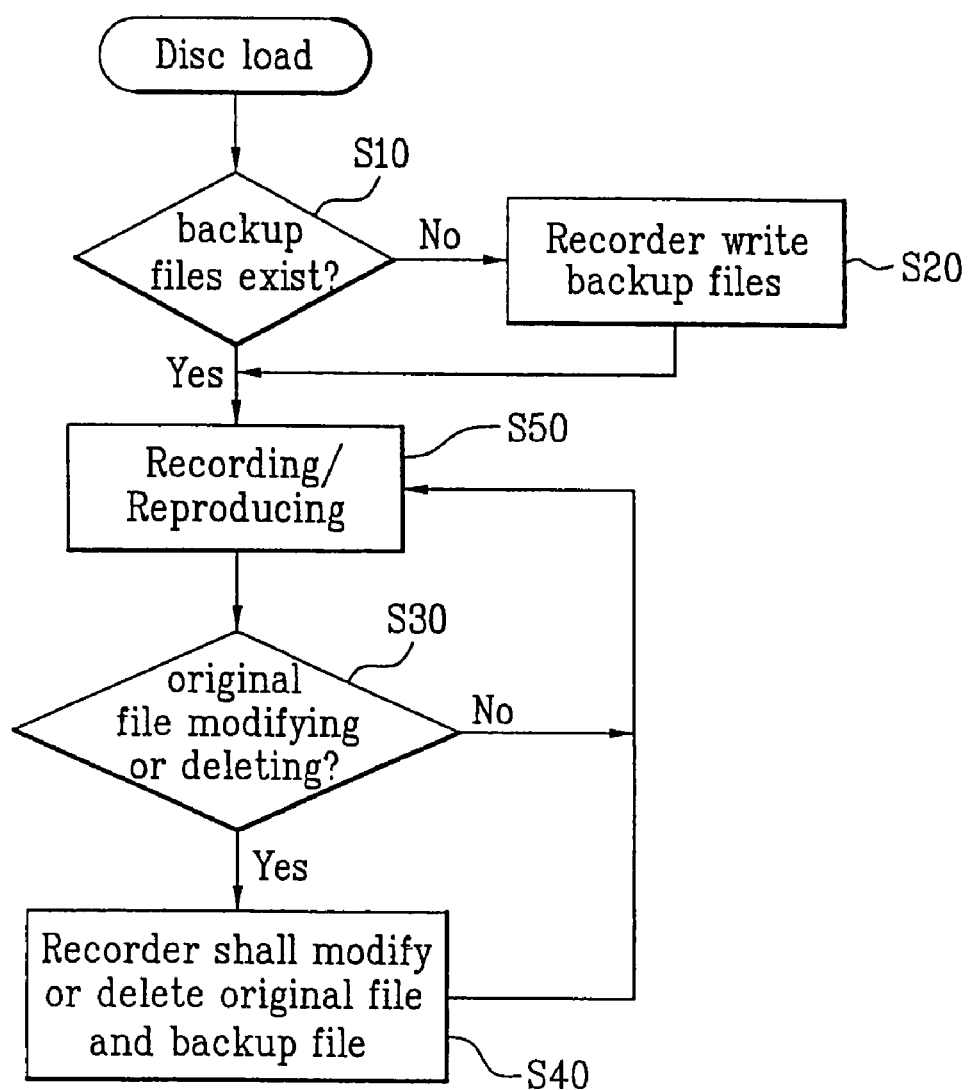
FIGS. 4A and 4B illustrate a method for managing files according to the present invention.
Figure 4B:
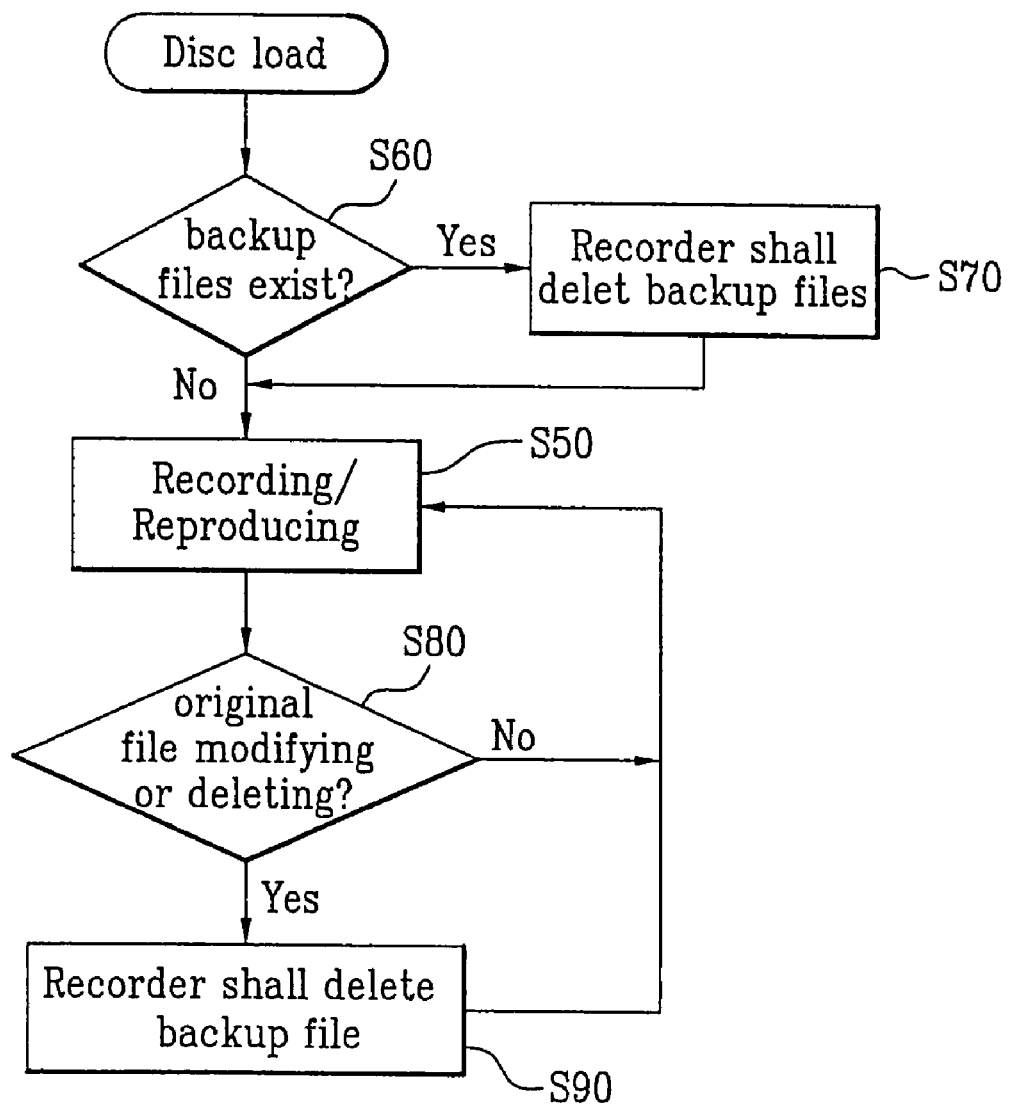

FIGS. 4A and 4B illustrate a method for controlling files according to the present invention. More specifically, FIG. 4A illustrates an example when the optical recording and reproducing apparatus is able to record and manage backup files, and FIG. 4B illustrates an example when the optical recording and reproducing apparatus is unable to record and manage the backup files.

Referring to FIG. 4A, when the optical disc is loaded, as an initial step, the apparatus verifies whether a backup file exists within the optical disc (S10). If a backup file does not exist, the optical recording and reproducing apparatus records the backup file in a predetermined area (S20). Subsequently, the apparatus performs a specific function, such as a recording (or writing) operation or a reproducing (or reading) operation (S50). Furthermore, when the apparatus receives a command requesting the original file to be deleted (S30), the optical recording and reproducing apparatus should delete the original file as well as the corresponding backup file (S40). After the completion of the above described step, the apparatus performs a specific function, such as a recording operation or a reproducing operation (S50).

Referring to FIG. 4B, when the optical disc is loaded, as an initial step, the apparatus verifies whether a backup file exists within the optical disc (S60). If a backup file exists, the optical recording and reproducing apparatus deletes the backup file that is recorded within the optical disc (S70). Subsequently, the apparatus performs a specific function, such as a recording (or writing) operation or a reproducing (or reading) operation (S50). Furthermore, when the apparatus receives a command requesting the original file to be modified or deleted (S80), the optical recording and reproducing apparatus should delete the backup file corresponding to the original file (S90). After the completing the above described step, the apparatus performs a specific function, such as a recording operation or a reproducing operation (S50).

When comparing the apparatus of FIG. 4A with the apparatus of FIG. 4B, the optical recording and reproducing apparatus that can manage backup files (shown in FIG. 4A) records and manages the backup file corresponding to the original file recorded within a specific area of the loaded disc by using the same method as that used for the original file. On the other hand, the optical recording and reproducing apparatus that is unable to manage backup files (shown in FIG. 4B) deletes the backup file recorded in a specific area of the loaded disc, thereby preventing system errors caused by existing backup files from occurring during future usage.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of recording data on a recording medium by a recording apparatus which is unable to create a backup file, comprising:
    deleting, by the recording apparatus, a backup file corresponding to an original file from the recording medium when the original file on the recording medium is modified,
    wherein the original file and the backup file are recorded at a pre-allocated area of the recording medium, and the pre-allocated area at which the backup file is recorded is physically separated from the pre-allocated area at which the original file is recorded.

2. The method of claim 1, further comprising:
    checking, by the recording apparatus, whether the backup file exist on the recording medium.

3. The method of claim 1, wherein the original file is reproduction management data used for managing reproduction of a stream file on the recording medium, and the backup file is a duplicate of the reproduction management data.

4. The method of claim 1, wherein the recording medium is a re-writable disc.

5. An apparatus for recording data on a recording medium by a recording apparatus which is unable to create a backup file, comprising:
    a pickup configured to record or delete data on the recording medium; and
    a controller configured to control the pickup to delete a backup file corresponding to an original file to be deleted when the original file is modified,
    wherein the original file and the backup file are recorded at a pre-allocated area of the recording medium, and the pre-allocated area at which the backup file is recorded is physically separated from the pre-allocated area at which the original file is recorded.

6. The apparatus of claim 5, wherein the controller is configured to check whether the backup file exist on the recording medium.

7. The apparatus of claim 5, wherein the original file is reproduction management data used for managing reproduction of a stream file on the recording medium, and the backup file is a duplicate of the reproduction management data.

8. The apparatus of claim 5, wherein the recording medium is a re-writable disc.

* * * * *